May 24, 1932.  A. VIGNE  1,859,608

BEARING

Filed July 28, 1930

INVENTOR:
Albert Vigne,
BY Hugh H. Wagner,
ATTORNEY.

Patented May 24, 1932

1,859,608

UNITED STATES PATENT OFFICE

ALBERT VIGNE, OF ST. LOUIS, MISSOURI, ASSIGNOR TO NATIONAL BEARING METALS CORPORATION, OF ST. LOUIS, MISSOURI, A CORPORATION OF NEW YORK

BEARING

Application filed July 28, 1930. Serial No. 471,208.

This invention relates to bearings, and has more particular reference to improvements in bronze bushings or "brasses" that engage the journals of shafts or axles and that are held in position in the box or supporting body by means of dowel pins that extend into the body and into the journal bushing or "brass". Owing to the fact that the dowel pins are formed of steel, and the bushings of non-ferrous metal that is softer than the steel dowel pins, the shocks of starting and stopping or of reversal of rotation the shaft in these bearings cause the dowel pins to hammer against the sides of the holes in the bushing that receive the dowel pins and thereby gradually to enlarge these holes and to force the material of the bushing that has been displaced by such enlargement toward the journal-engaging surface of the bearing, thereby causing undue binding and friction at said surface by the protruded material thereof adjacent said holes. Furthermore, as soon as the pins become loose in these holes, the resulting vibration of the pins in the holes increases the force of their impact against the sides of the holes and thereby aggravates an already serious objectionable condition.

Accordingly, the principal purpose of the present invention is to provide means for preventing undue enlargement of the dowel-pin-receiving holes in the bearing brasses. Other objects, advantages and desirable features of the invention will appear in the course of the following description of an illustrative embodiment of the spirit thereof.

In the accompanying drawings forming part of this specification, in which like numbers of reference denote like parts wherever they occur, Figure 1 is a plan view of one form of bearing brass embodying the present invention;

Figure 1:
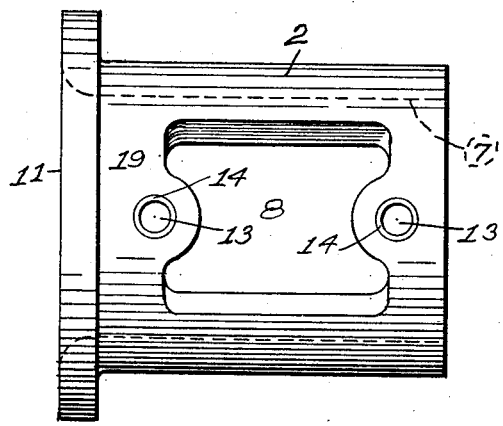
Figure 2:
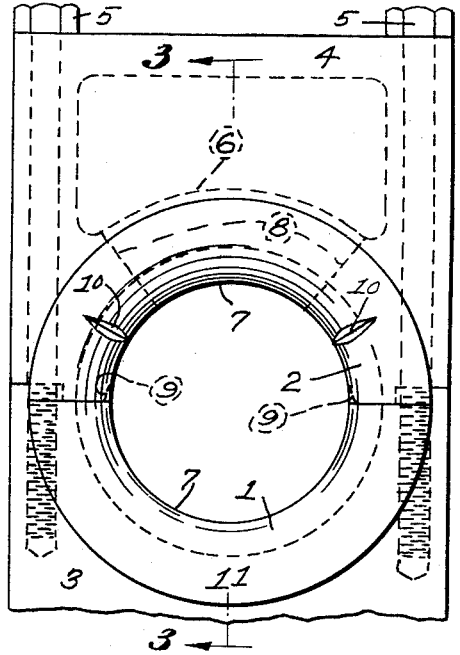
Figure 2 is a side elevation showing the same in the body of the bearing.
Figure 3:
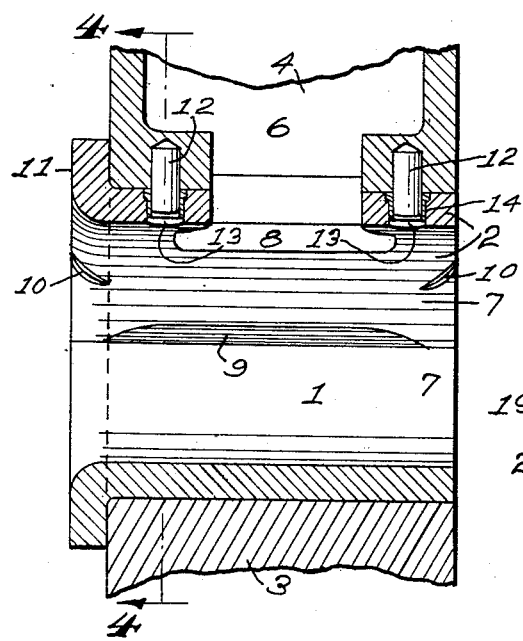
Figure 3 is a sectional view taken on the line 3—3 in Figure 2.
Figure 4:
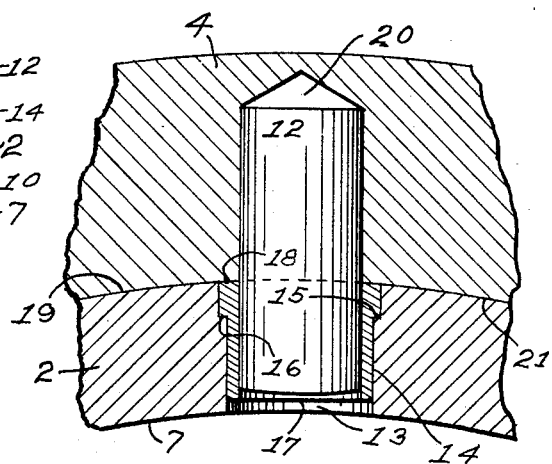
Figure 4 is a fragmentary enlargement sectional view taken on the line 4—4 in Figure 3.

The present invention, in its broadest aspect, contemplates the provision of a wear-resistant protective surface for the dowel pin hole in a bearing brass, so that the impacts of the surface of the hole against the dowel pin will not deform the softer or less wear-resistant material surrounding said hole. More specifically, the invention is carried out by forming the hole for the dowel pin larger than the diameter of the pin, and then lining the hole with a steel bushing to fit the dowel pin. It will be appreciated that the invention is applicable to divers suitable types of bearings, although, in the illustrative embodiment, the bearing comprises diametrically opposing halves of bronze, 1 and 2, seated in the supporting body or block 3 and its cap 4, respectively. The cap 4 may be secured to the body 3 in the usual manner by cap screws 5, passing in unthreaded relation through holes therein and screwing into tapped holes in the body 3. The cap 4 may be provided with a lubricant chamber or pocket 6 that opens into the brass 2 and communicates with the journal-engaging face 7 of the brass through an opening 8 formed in the brass 2. The journal-engaging face 7 of the bearing may be provided with lubricant-distributing grooves 9, and nicks or channels 10 may be provided to convey lubricant from the journal-engaging face 7 to the thrust or hub-engaging face 11 of the bearing. One or more dowel pins 12 are anchored in the cap 4 and project into openings 13, formed in the brass 2. The openings 13 are lined with tightly fitting steel bushings 14, whose holes closely, but preferably slidably, fit the dowel pins 12. The outer ends of the openings 13 enlarge to form shoulders 15, and the outer ends of the bushings 14 enlarge likewise to form shoulders 16 that co-operate with the shoulders 15 to maintain the inner ends 17 of said bushings 14 in retracted relation to the wear-receiving surface 7 of the bearing, whereby the comparatively hard bushings 14 can not bear on and wear down the journal unevenly. Engagement of the bushings 14 with the journal of the axle would also tend to loosen the bushings in the holes 13. The bushings 14 are preferably formed of machine steel with flat ends, their outer ends 18, after the bushings have been positioned in the holes 13, being filed round concentric with the axis of the bearing, so that the outer ends 18 form flush continuations of the outer cylindrical surface 19 of the brass 2, as best shown in Figure 4. The dowel pins 12 are held in suitable holes 20 in the cap 4 in any suitable manner, preferably by means of a tight fit. The dowel pins preferably fit looser in the bushings 14 than in the holes 20, so that, when the cap 4 is removed from the body 3, the brass 2 can be pulled directly away from its concave seat 21 in the cap 4, the bushings 14 sliding easily over the dowel pins 12.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. A bearing of the character described having an opening therein for receiving a dowel pin, and a bushing in the opening formed of material that is harder than the bearing material.

2. A bearing of the character described formed of non-ferrous material and having an opening for a dowel pin, and a steel bushing lining the said opening.

3. A bearing of the character described having an opening for a dowel pin, and a bushing in the opening formed of material more resistant to deformation than the material of the bearing, said opening and said bushing having co-operating shoulders that maintain said bushing within proper bounds.

4. A bearing of the character described having its wall apertured for receiving a dowel pin, and a bushing in the opening formed of harder material than the bearing, said aperture and said bushing having co-operating shoulders that maintain the inner end of said bushing in retracted relation to the wear-receiving surface of the bearing.

5. A bearing of the character described having an opening therein lined with steel for receiving a dowel pin, the inner end of said material being disposed in retracted relation to the wear-receiving surface of the bearing.

6. A bearing of the character described having an opening therein for receiving a dowel pin, and a bushing in the opening formed of material that is harder than the bearing material, the bushing being disposed in retracted relation to the wear-receiving surface of the bearing.

7. A bearing of the character described formed of non-ferrous metal and having an opening for a dowel pin, and a steel bushing lining the said opening, the bushing being disposed in retracted relation to the wear-receiving surface of the bearing.

8. A bearing of the character described having an opening therein for receiving a dowel pin, said opening being lined with material that is harder than the bearing material.

In testimony whereof I hereunto affix my signature.

ALBERT VIGNE.